(12) United States Patent
Yamada et al.

(10) Patent No.: US 11,244,566 B2
(45) Date of Patent: Feb. 8, 2022

(54) MAP UPDATING DEVICE, MAP UPDATING SYSTEM, AND MAP UPDATING METHOD

(71) Applicant: Mitsubishi Electric Corporation, Tokyo (JP)

(72) Inventors: Nozomi Yamada, Tokyo (JP); Yoshihiro Nakai, Kobe (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 73 days.

(21) Appl. No.: 16/754,338

(22) PCT Filed: Dec. 12, 2017

(86) PCT No.: PCT/JP2017/044566
§ 371 (c)(1),
(2) Date: Apr. 7, 2020

(87) PCT Pub. No.: WO2019/116447
PCT Pub. Date: Jun. 20, 2019

(65) Prior Publication Data
US 2020/0334981 A1 Oct. 22, 2020

(51) Int. Cl.
*G08G 1/0968* (2006.01)
*H04W 4/46* (2018.01)
*G08G 1/0967* (2006.01)

(52) U.S. Cl.
CPC . *G08G 1/096822* (2013.01); *G08G 1/096791* (2013.01); *G08G 1/096844* (2013.01); *H04W 4/46* (2018.02)

(58) Field of Classification Search
CPC ....... G08G 1/096822; G08G 1/096791; G08G 1/096844; G08G 1/096827; H04W 4/46; G01C 21/3815; G01C 21/3841
See application file for complete search history.

(56) References Cited

U.S. PATENT DOCUMENTS 9,043,138 B2* 5/2015 Ginsberg ........... G01C 21/3811
  701/450
2009/0070031 A1* 3/2009 Ginsberg ........... G01C 21/3811
  701/532

(Continued)

FOREIGN PATENT DOCUMENTS

JP  2004-251790 A  9/2004
JP  2005-349878 A  12/2005

(Continued)

*Primary Examiner* — Thomas Ingram
(74) *Attorney, Agent, or Firm* — Birch, Stewart, Kolasch & Birch, LLP

(57) ABSTRACT

A surrounding information obtaining unit determines whether a first vehicle has traveled on a different road than a road on which a host vehicle travels, on the basis of information indicating roads and a facility present around the host vehicle and a travel state of the first vehicle. A difference checking unit checks whether a target road determined to have been traveled by the first vehicle is included in host vehicle map information. A wireless communication unit inquires whether an unknown target road confirmed not to be included in the host vehicle map information is included in master map information in a server device. When the unknown target road is included in the master map information, the wireless communication unit receives updating map information including the unknown target road from the server device. A map updating unit updates the host vehicle map information using the updating map information.

12 Claims, 9 Drawing Sheets

(56) References Cited

U.S. PATENT DOCUMENTS

| | | | | |
|---|---|---|---|---|
| 2010/0014712 A1* | 1/2010 | Sampedro Diaz | ..... | G01C 21/32 382/104 |
| 2013/0278443 A1* | 10/2013 | Rubin | .............. | G08G 1/096791 340/905 |
| 2017/0010616 A1* | 1/2017 | Shashua | .................. | G01C 21/32 |
| 2019/0066491 A1* | 2/2019 | Okubo | ................. | G08G 1/0133 |
| 2021/0049901 A1* | 2/2021 | Young | ..................... | H04W 4/46 |

FOREIGN PATENT DOCUMENTS

| | | | |
|---|---|---|---|
| JP | 2007-65042 A | 3/2007 | |
| JP | 2007-93260 A | 4/2007 | |

* cited by examiner

| Identification Information (Vehicle Number) | Destination | Estimated Arrival Time | Location | Travel Conditions | ... |
|---|---|---|---|---|---|
| Kobe Chi XXXX | Ikebukuro | 8:00 | Kobe | Speed Of 60 Km Per Hour ... | ... |

MAP UPDATING DEVICE, MAP UPDATING SYSTEM, AND MAP UPDATING METHOD

TECHNICAL FIELD

The invention relates to a map updating device, a map updating system, and a map updating method that update information about a new road.

BACKGROUND ART

For example, a navigation device described in Patent Literature 1 creates new road information from a travel path of a host vehicle when the host vehicle is traveling on a road that is not included in map information, and adds the new road information to the existing map information, and thereby updates the map information.

CITATION LIST

Patent Literatures

Patent Literature 1: JP 2004-251790 A

SUMMARY OF INVENTION

Technical Problem

Since the conventional navigation device is configured in the above-described manner, there is a problem that, when a new road is built, unless the host vehicle travels on the new road, the map information cannot be updated.

The invention is made to solve the problem described above, and an object of the invention is to update map information without a host vehicle traveling on a new road.

Solution to Problem

A map updating device according to the invention includes a processor to execute a program, and a memory to store the program which, when executed by the processor, performs processes of, obtaining information indicating roads and a facility present around a host vehicle and a travel state of a first vehicle, and determining whether the first vehicle has traveled on a different road than a road on which the host vehicle travels, on a basis of the obtained information, storing host vehicle map information, checking whether a target road is included in the host vehicle map information, the target road being determined to have been traveled by the first vehicle, inquiring of a server device whether the target road is included in master map information stored in the server device and receiving updating map information including the target road from the server device when the target road is included in the master map information, the target road being confirmed not to be included in the host vehicle map information, and updating the host vehicle map information using the updating map information including the target road.

Advantageous Effects of Invention

According to the invention, a request for updating map information is made to the server device, which is triggered by another vehicle traveling on a different road than a road on which the host vehicle travels, and thus, map information can be updated without the host vehicle traveling on a new road.

DESCRIPTION OF EMBODIMENTS

To describe the invention in more detail, modes for carrying out the invention will be described below with reference to the accompanying drawings.

First Embodiment

Figure 1:
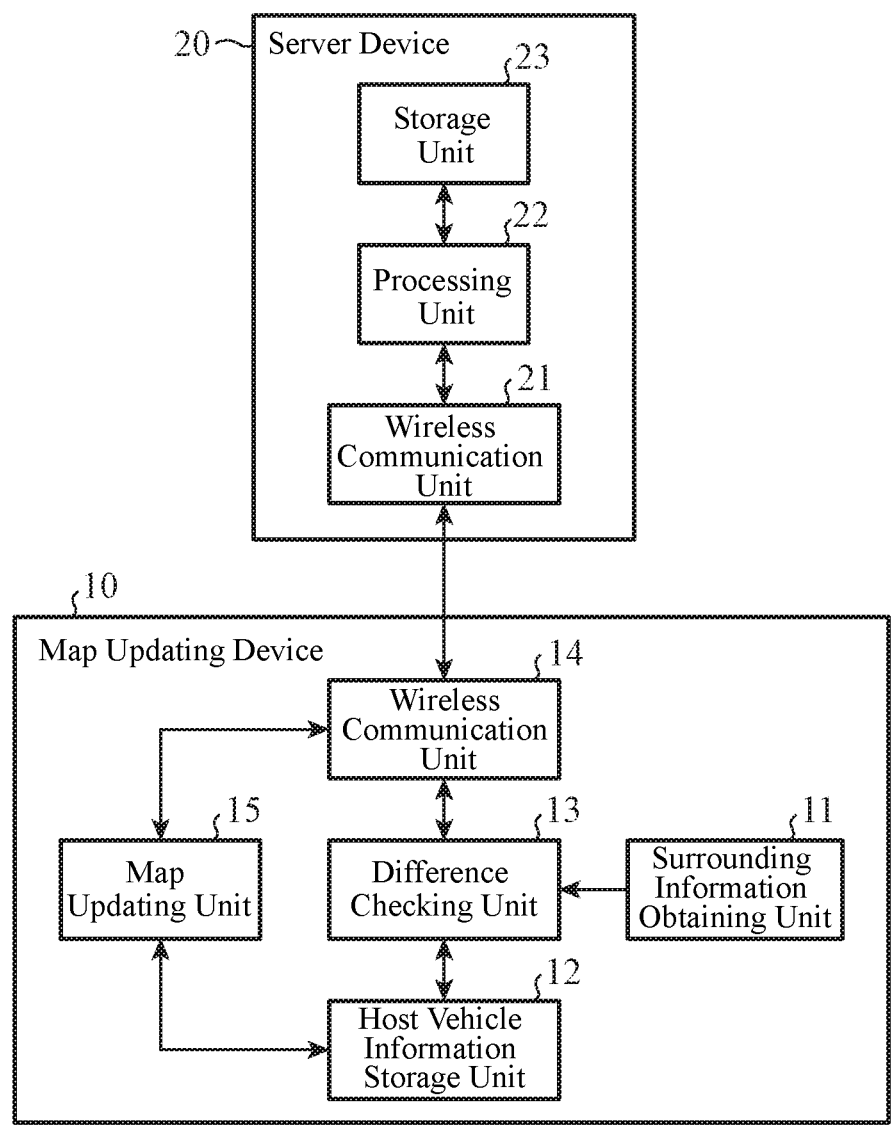
FIG. 1 is a block diagram showing an exemplary configuration of a map updating system according to a first embodiment.

FIG. 1 is a block diagram showing an exemplary configuration of a map updating system according to a first embodiment. The map updating system includes a map updating device 10 mounted on a vehicle; and a server device 20 built outside the vehicle. Note that FIG. 1 shows a state in which a single map updating device 10 mounted on a single vehicle can perform wireless communication with the server device 20, but the map updating device 10 mounted on each of multiple vehicles can perform wireless communication with another one.

The map updating device 10 includes a surrounding information obtaining unit 11, a host vehicle information storage unit 12, a difference checking unit 13, a wireless communication unit 14, and a map updating unit 15.

The surrounding information obtaining unit 11 obtains information indicating roads and facilities present around a host vehicle and a travel state of another vehicle, and determines whether another vehicle has traveled on a different road than a road on which the host vehicle travels, on the basis of the obtained information. For example, the surrounding information obtaining unit 11 obtains information on a facility which is included in host vehicle map information stored in the host vehicle information storage unit 12. In addition, for example, the surrounding information obtaining unit 11 obtains an image of an area around the host vehicle which is captured by a camera mounted on the host vehicle, and processes the image, and thereby obtains the shape of a road, etc., as information on the road and obtains the location of another vehicle, etc., as information indicating a travel state of another vehicle. Note that the camera may be any camera as long as the camera captures at least an image in a traveling direction of the host vehicle, and more desirably a camera that captures a 360-degree image of an area around the host vehicle. In addition, for example, the surrounding information obtaining unit 11 may obtain information that is detected by a distance sensor mounted on the host vehicle, and obtain the location of another vehicle, etc., on the basis of the information, as information indicating a travel state of another vehicle. Since the surrounding information obtaining unit 11 can use the camera, the distance sensor, or the like, which is already mounted on the host vehicle, initial cost is not required. If the surrounding information obtaining unit 11 determines that another vehicle has traveled on a different road than a road on which the host vehicle travels, the surrounding information obtaining unit 11 outputs the different road, as a target road, to the difference checking unit 13.

For example, when the host vehicle is traveling straight ahead and another vehicle has made a right or left turn, the surrounding information obtaining unit 11 determines that another vehicle has traveled on a different road than a road on which the host vehicle travels, and determines that the road that another vehicle has entered by making a right or left turn is a target road.

In addition, for example, when the host vehicle is making a right or left turn and another vehicle has traveled straight ahead, the surrounding information obtaining unit 11 determines that another vehicle has traveled on a different road than a road on which the host vehicle travels, and determines that the road on which another vehicle has traveled straight ahead is a target road.

In addition, for example, when the host vehicle and another vehicle are traveling in the same direction, but another vehicle goes up or down compared to the host vehicle, the surrounding information obtaining unit 11 determines that another vehicle has traveled on a different road than a road on which the host vehicle travels, and determines that the road on which another vehicle has traveled is a target road.

Note that when a place where another vehicle has entered by making a right turn is a parking lot of a facility or the like and is not a road, the surrounding information obtaining unit 11 does not make a determination as to a target road.

The host vehicle information storage unit 12 stores map information including information on roads, information on facilities, and the like. The map information stored in the host vehicle information storage unit 12 is referred to as "host vehicle map information". The host vehicle map information is used by a navigation device (not shown) to search for a route from a current location of the host vehicle or a point of departure to a destination and provide guidance on the route.

The difference checking unit 13 checks whether the target road that is determined by the surrounding information obtaining unit 11 to have been traveled by another vehicle is included in the host vehicle map information in the host vehicle information storage unit 12. When information on a road corresponding to the target road is included in the host vehicle map information, the difference checking unit 13 determines that the target road is a known road (hereinafter, referred to as "known target road"). On the other hand, when information on a road corresponding to the target road is not included in the host vehicle map information, the difference checking unit 13 determines that the target road is a newly-built, unknown road (hereinafter, referred to as "unknown target road"), and outputs information on the unknown target road to the wireless communication unit 14.

The wireless communication unit 14 wirelessly communicates with a wireless communication unit 21 of the server device 20. The wireless communication unit 14 inquires of the server device 20 whether the unknown target road that is confirmed by the difference checking unit 13 not to be included in the host vehicle map information is included in master map information stored in a storage unit 23 of the server device 20. When the unknown target road is included in the master map information, the wireless communication unit 14 receives map information including the unknown target road (hereinafter, referred to as "updating map information") from the wireless communication unit 21 of the server device 20. The wireless communication unit 14 outputs the received updating map information to the map updating unit 15.

The map updating unit 15 updates the host vehicle map information in the host vehicle information storage unit 12, using the updating map information received by the wireless communication unit 14. Namely, the map updating unit 15 replaces map information including the unknown target road out of the host vehicle map information with the updating map information.

The server device 20 includes the wireless communication unit 21, a processing unit 22, and the storage unit 23.

The wireless communication unit 21 wirelessly communicates with the wireless communication unit 14 of the map updating device 10. The wireless communication unit 21 receives an inquiry about whether the unknown target road is included in the master map information, from the wireless communication unit 14 of the map updating device 10, and outputs the inquiry to the processing unit 22. In addition, the wireless communication unit 21 receives a response to the inquiry from the processing unit 22 and transmits the response to the wireless communication unit 14 of the map updating device 10.

The processing unit 22 receives the inquiry about whether the unknown target road is included in the master map information, from the wireless communication unit 21. When the unknown target road is included in the master map information stored in the storage unit 23, the processing unit 22 extracts map information including the unknown target road from the master map information, and outputs the map information, as updating map information, to the wireless communication unit 21. On the other hand, when the unknown target road is not included in the master map information, the processing unit 22 outputs a notification indicating that there is no updating map information to the wireless communication unit 21.

The storage unit 23 stores the master map information. The master map information is updated when a road is newly built, but there is a time lag before information on the newly built road is reflected in the master map information. Hence, there is a case in which the map updating device 10 detects a newly built road prior to updating the master map information.

Figure 2:
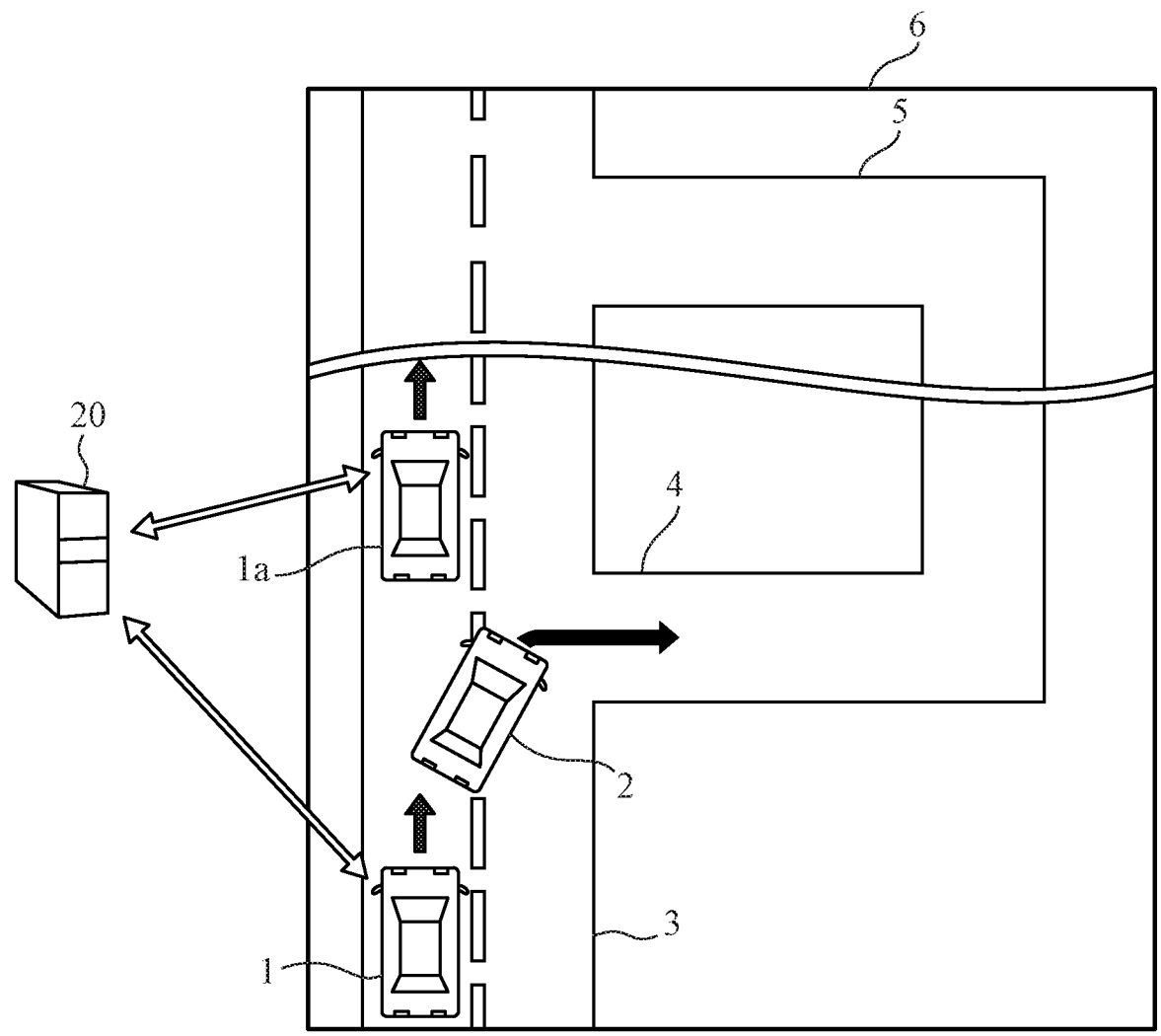
FIG. 2 is a diagram describing an overview of the map updating system according to the first embodiment.

FIG. 2 is a diagram describing an overview of the map updating system according to the first embodiment. In a scene shown in FIG. 2, a host vehicle 1 has the map updating device 10 mounted thereon. The host vehicle 1 is traveling straight ahead on a road 3, and travels to the location of a host vehicle 1*a*. Another vehicle 2 traveling ahead of the host vehicle 1 makes a right turn on the road 3 and enters a road 4. The road 4 extends to a road 5.

In the following, the map updating system according to the first embodiment will be described using the scene shown in FIG. 2 as an example.

Figure 3:
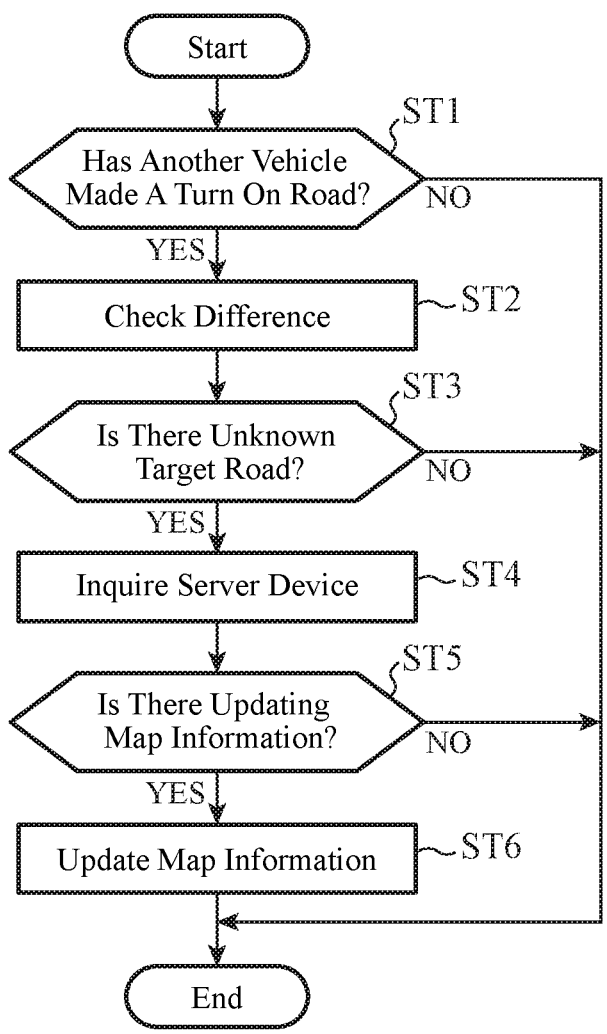
FIG. 3 is a flowchart showing exemplary operation of a map updating device according to the first embodiment.

FIG. 3 is a flowchart showing exemplary operation of the map updating device 10 according to the first embodiment. The map updating device 10 repeats the operation shown in the flowchart of FIG. 3.

At step ST1, the surrounding information obtaining unit 11 obtains, from the camera, etc., information indicating the roads 3 and 4 and facilities present around the host vehicle 1 and a travel state of another vehicle 2. For example, when the surrounding information obtaining unit 11 determines, on the basis of the obtained information, that another vehicle 2 traveling ahead of the host vehicle 1 has entered the road 4 by making a right turn on the road 3 ("YES" at step ST1), the surrounding information obtaining unit 11 determines that another vehicle 2 has traveled on a different road than a road on which the host vehicle 1 travels, and proceeds to step ST2. Otherwise ("NO" at step ST1), the surrounding information obtaining unit 11 ends the operation shown in the flowchart of FIG. 3. In addition, for example, when the surrounding information obtaining unit 11 determines that another vehicle 2 traveling behind the host vehicle 1a has entered the road 4 by making a right turn on the road 3 ("YES" at step ST1), the surrounding information obtaining unit 11 determines that another vehicle 2 has traveled on a different road than a road on which the host vehicle 1a travels, and proceeds to step ST2.

At step ST2, the difference checking unit 13 checks whether the road 4 that is determined by the surrounding information obtaining unit 11 to have been travelled by another vehicle 2, i.e., a target road, is included in the host vehicle map information in the host vehicle information storage unit 12. when the difference checking unit 13 determines that the target road is an unknown target road that is not included in the host vehicle map information ("YES" at step ST3), the difference checking unit 13 proceeds to step ST4, and when the target road is a known target road ("NO" at step ST3), the difference checking unit 13 ends the operation shown in the flowchart of FIG. 3.

At step ST4, the wireless communication unit 14 inquires of the server device 20 whether the road 4 that is determined by the difference checking unit 13 to be an unknown target road is included in the master map information. Then, the wireless communication unit 14 receives a response to the inquiry from the server device 20. When the unknown target road is included in the master map information, the server device 20 transmits, as a response, updating map information including the unknown target road to the map updating device 10, and when the unknown target road is not included in the master map information, the server device 20 transmits, as a response, a notification indicating that there is no updating map information to the map updating device 10. For example, when the server device 20 updates the map information on a mesh-by-mesh basis, the processing unit 22 uses mesh data including the road 4 which is the unknown target road, as updating map information 6. The updating map information 6 includes information on the road 4 which is the unknown target road and the unknown road 5 connected to the road 4, etc.

At step ST5, when the wireless communication unit 14 has received the updating map information 6 including the road 4 which is the unknown target road from the server device 20 ("YES" at step ST5), the wireless communication unit 14 proceeds to step ST6, and when the wireless communication unit 14 has received, as a response, a notification indicating that there is no updating map information 6 from the server device 20 ("NO" at step ST5), the wireless communication unit 14 ends the operation shown in the flowchart of FIG. 3.

At step ST6, the map updating unit 15 updates the host vehicle map information stored in the host vehicle information storage unit 12, using the updating map information 6 received by the wireless communication unit 14.

Note that when the navigation device mounted on the host vehicle is providing guidance on a route using pre-update host vehicle map information, the navigation device re-searches a route using the host vehicle map information updated at step ST6.

As described above, the map updating device 10 according to the first embodiment includes the surrounding information obtaining unit 11, the host vehicle information storage unit 12, the difference checking unit 13, the wireless communication unit 14, and the map updating unit 15. The surrounding information obtaining unit 11 obtains information indicating roads and facilities present around a host vehicle and a travel state of another vehicle, and determines whether another vehicle has traveled on a different road than a road on which the host vehicle travels, on the basis of the obtained information. The host vehicle information storage unit 12 stores host vehicle map information. The difference checking unit 13 checks whether a target road that is determined by the surrounding information obtaining unit 11 to have been traveled by another vehicle is included in the host vehicle map information. The wireless communication unit 14 inquires of the server device 20 whether an unknown target road that is confirmed by the difference checking unit 13 not to be included in the host vehicle map information is included in master map information stored in the server device 20. In addition, when the unknown target road is included in the master map information, the wireless communication unit 14 receives updating map information including the unknown target road from the server device 20. The map updating unit 15 updates the host vehicle map information using the updating map information received by the wireless communication unit 14. The map updating device 10 requests the server device 20 for updating map information, which is triggered by a determination that another vehicle has traveled on a different road than a road on which the host vehicle travels, and thus can update the map information without the host vehicle traveling on a new road. In addition, the map updating device 10 can reduce the amount of communication compared to a case in which the map updating device 10 periodically requests the server device 20 to update the map information, or the server device 20 periodically notifies the map updating device 10 of an update to the map information. Furthermore, when a new road has been built, the map updating device 10 can make an update at earlier timing than a case in which the map information is periodically updated.

Second Embodiment

The map updating device 10 according to the first embodiment is configured to update host vehicle map information for all detected unknown target roads. On the other hand, a map updating device 10 according to a second embodiment is configured to update host vehicle map information for those unknown target roads useful to an occupant of a host vehicle among detected unknown target roads.

Figures 4, 5:
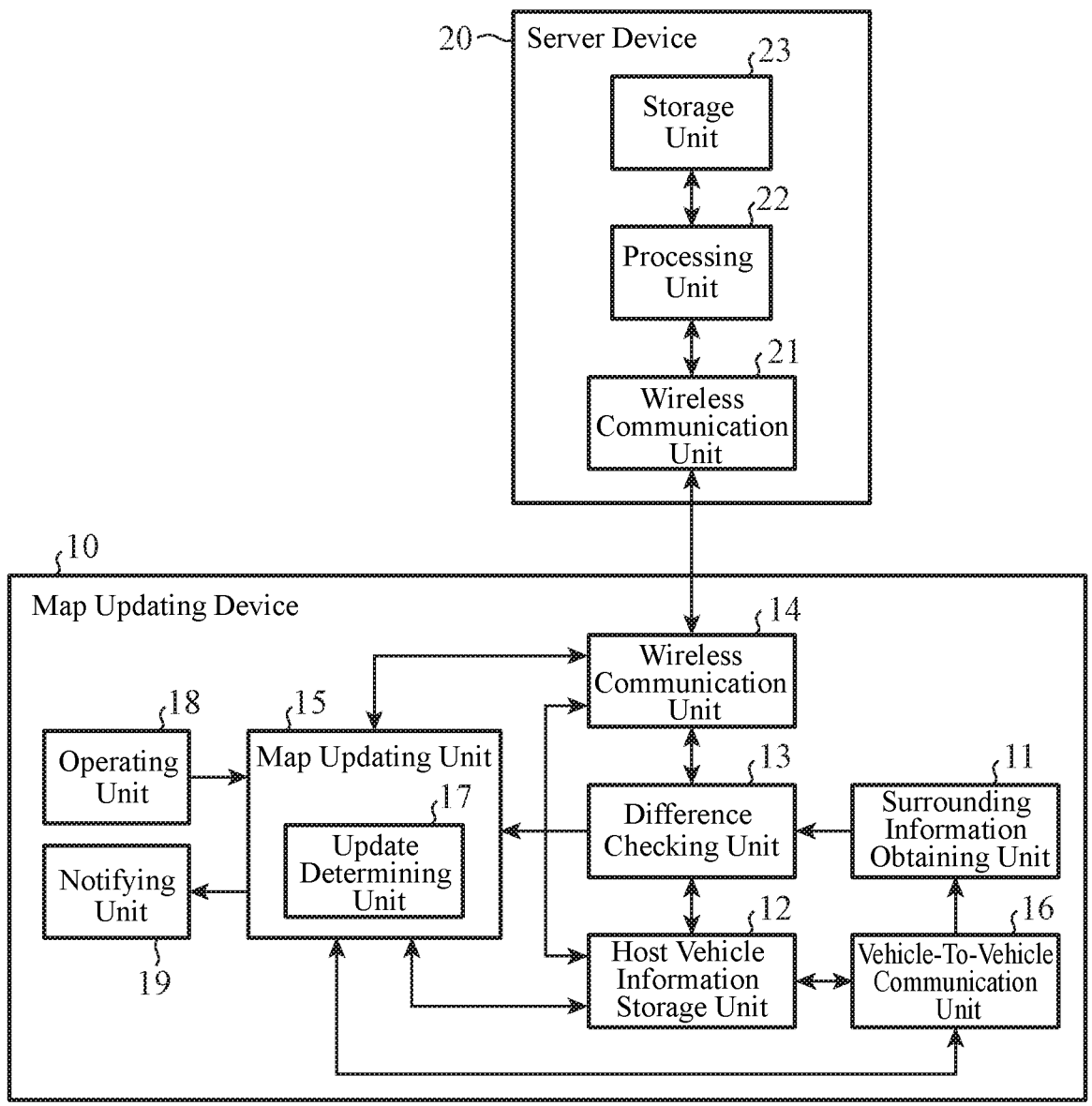
FIG. 4 is a block diagram showing an exemplary configuration of a map updating system according to a second embodiment.
FIG. 5 is a diagram showing an example of vehicle information stored in a storage unit of a server device according to the second embodiment.

FIG. 4 is a block diagram showing an exemplary configuration of a map updating system according to the second embodiment. The map updating device 10 according to the second embodiment is configured in such a manner that a vehicle-to-vehicle communication unit 16, an update determining unit 17, an operating unit 18, and a notifying unit 19 are added to the map updating device 10 of the first embodiment which is shown in FIG. 1. In FIG. 4, the same or corresponding portions as/to those in FIG. 1 are given the same reference signs. The following describes portions of the map updating device 10 and a server device 20 of the second embodiment that differ from the map updating device 10 and the server device 20 of the first embodiment.

A surrounding information obtaining unit 11 can supplementarily use vehicle information of another vehicle which is received by the vehicle-to-vehicle communication unit 16, when determining whether another vehicle has traveled on a different road than a road on which the host vehicle travels, on the basis of information indicating roads and facilities present around the host vehicle and a travel state of another vehicle. For example, when the surrounding information obtaining unit 11 determines, from an image captured by the camera, that another vehicle is making a left or right turn, the surrounding information obtaining unit 11 checks against the state of blinkers of another vehicle which is received by the vehicle-to-vehicle communication unit 16, and thereby improves the accuracy of the determination.

A host vehicle information storage unit 12 stores vehicle information such as a travel route history of the host vehicle, identification information of the host vehicle, a destination, estimated arrival time which is the estimated time of arrival at the destination, a location, or travel conditions, in addition to host vehicle map information. The identification information is, for example, a vehicle number on a license plate. The travel conditions include speed per hour, the state of blinkers, or the like.

A wireless communication unit 14 requests the server device 20 for updating map information including an unknown target road that is specified by the update determining unit 17, receives the updating map information from the server device 20, and outputs the updating map information to a map updating unit 15. In addition, the wireless communication unit 14 transmits to the server device 20 vehicle information such as the identification information of the host vehicle, a destination, estimated arrival time which is the estimated time of arrival at the destination, arrival time at which the host vehicle has actually arrived at the destination, a location, or travel conditions, which is stored in the host vehicle information storage unit 12. In addition, the wireless communication unit 14 requests the server device 20 for vehicle information by specifying identification information of another vehicle, receives vehicle information such as arrival time of another vehicle having the identification information from the server device 20, and outputs the vehicle information to the update determining unit 17.

The map updating unit 15 updates the host vehicle map information stored in the host vehicle information storage unit 12, in response to an instruction from the update determining unit 17.

The vehicle-to-vehicle communication unit 16 performs vehicle-to-vehicle communication with another vehicle present around the host vehicle. In the second embodiment, another vehicle also has a map updating device 10 mounted thereon, and the vehicle-to-vehicle communication unit 16 of the map updating device 10 mounted on the host vehicle and a vehicle-to-vehicle communication unit 16 of the map updating device 10 mounted on another vehicle wirelessly communicate with each other. The vehicle-to-vehicle communication unit 16 transmits the vehicle information of the host vehicle stored in the host vehicle information storage unit 12 to another vehicle. In addition, the vehicle-to-vehicle communication unit 16 receives vehicle information of another vehicle from another vehicle, and outputs the vehicle information to the surrounding information obtaining unit 11 and the update determining unit 17.

The update determining unit 17 determines whether an unknown target road that is confirmed by a difference checking unit 13 not to be included in the host vehicle map information is useful to the occupant of the host vehicle. The update determining unit 17 instructs the wireless communication unit 14 to receive updating map information for the unknown target road determined to be useful from the server device 20, and instructs the map updating unit 15 to update the host vehicle map information using the updating map information which is received by the wireless communication unit 14 from the server device 20.

For example, the update determining unit 17 determines whether the host vehicle is highly likely to travel on an unknown target road, using information such as a travel route history or a destination which is stored in the host vehicle information storage unit 12. The update determining unit 17 determines that the unknown target road on which the host vehicle is highly likely to travel is useful.

In addition, for example, when a destination of another vehicle having traveled on an unknown target road, which is received by the vehicle-to-vehicle communication unit 16, matches a destination of the host vehicle stored in the host vehicle information storage unit 12, the update determining unit 17 compares estimated arrival time of another vehicle received by the vehicle-to-vehicle communication unit 16 with estimated arrival time of the host vehicle. When the estimated arrival time of another vehicle is earlier than the estimated arrival time of the host vehicle, the update determining unit 17 determines that the unknown target road on which this another vehicle has traveled is useful.

Note that the update determining unit 17 may determine whether the unknown target road is useful, on the basis of the actual arrival time instead of the estimated arrival time. The arrival time of another vehicle is received by the wireless communication unit 14 from the server device 20.

In addition, when the update determining unit 17 receives from the operating unit 18 an update instruction for an unknown target road determined to be useless, which is provided by the occupant of the host vehicle, the update determining unit 17 instructs the map updating unit 15 to update the host vehicle map information using updating map information including the unknown target road determined to be useless.

In addition, for example, when the number of unknown target roads determined to be useless has reached greater than or equal to a predetermined number which is determined in advance, the update determining unit 17 instructs the map updating unit 15 to update the host vehicle map information using updating map information including the unknown target roads whose number is greater than or equal to the predetermined number. For example, when 10 unknown target roads have accumulated, the update determining unit 17 allows the host vehicle map information to be collectively updated.

In addition, for example, when the update determining unit 17 receives a delete instruction provided by the occupant of the host vehicle from the operating unit 18, the update determining unit 17 instructs the map updating unit 15 to delete information on a road that is a target of the delete instruction from the host vehicle map information.

The operating unit 18 receives an operation performed by the occupant of the host vehicle, and outputs the operation to the update determining unit 17. The operating unit 18 is a touch panel, a voice recognition device, or the like.

The notifying unit 19 notifies the occupant of the host vehicle of information received from the update determining unit 17. The notifying unit 19 is a display device, an audio output device, or the like.

A wireless communication unit 21 of the server device 20 receives vehicle information from the host vehicle and other vehicles. A processing unit 22 allows a storage unit 23 to store the vehicle information received by the wireless communication unit 21. In addition, when the wireless communication unit 21 receives a request for vehicle information with identification information specified, the processing unit 22 obtains vehicle information of a vehicle having the identification information from the storage unit 23, and allows the wireless communication unit 21 to transmit the vehicle information to the map updating device 10. FIG. 5 is a diagram showing an example of vehicle information stored in the storage unit 23 of the server device 20 according to the second embodiment.

Next, the operation of the map updating system according to the second embodiment will be described.

Figure 6:
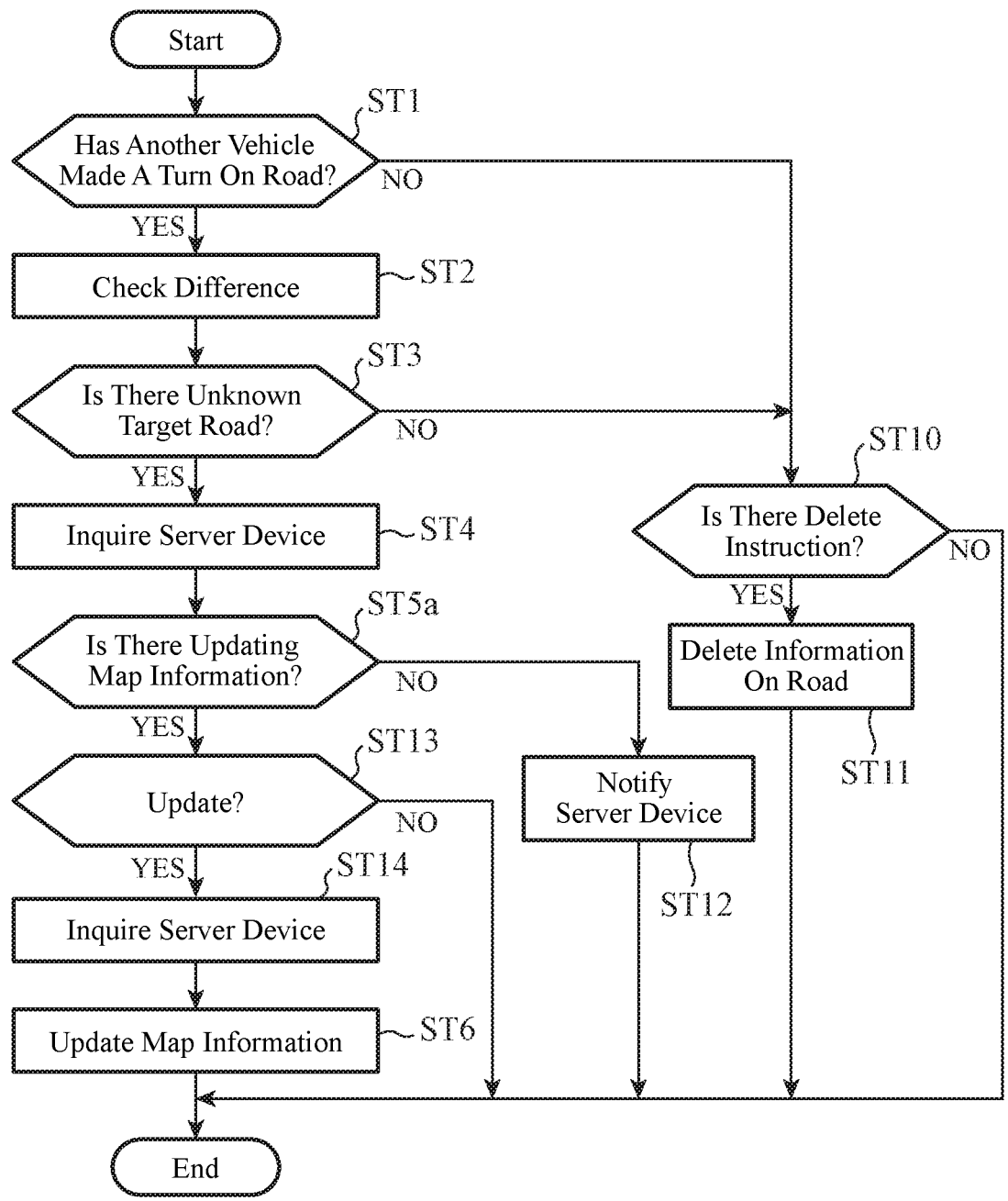
FIG. 6 is a flowchart showing exemplary operation of a map updating device according to the second embodiment.

FIG. 6 is a flowchart showing exemplary operation of the map updating device 10 according to the second embodiment. The map updating device 10 repeats the operation shown in the flowchart of FIG. 6. Step ST1 to ST4 and ST6 of FIG. 6 have the same operation as step ST1 to ST4 and ST6 of FIG. 3, and thus, description thereof is omitted.

When the difference checking unit 13 has confirmed that a target road is a known target road ("NO" at step ST3), the difference checking unit 13 proceeds to step ST10.

At step ST10, when the operating unit 18 has received an operation for a delete instruction from the occupant ("YES" at step ST10), the operating unit 18 outputs information on the delete instruction to the update determining unit 17, and proceeds to step ST11, or otherwise ("NO" at step ST10), the operating unit 18 ends the operation shown in the flowchart of FIG. 6.

At step ST11, when the update determining unit 17 receives the information on the delete instruction from the operating unit 18, the update determining unit 17 instructs the map updating unit 15 to delete information on a road on which the host vehicle is traveling at step ST1, e.g., information on the road 3 of FIG. 2, from the host vehicle map information in the host vehicle information storage unit 12. In addition, when the update determining unit 17 receives the information on the delete instruction from the operating unit 18, the update determining unit 17 instructs the map updating unit 15 to delete information on the road determined to be a known target road at step ST3, e.g., information on the road 4 of FIG. 2, from the host vehicle map information. Here, the occupant performs an operation for a delete instruction on the operating unit 18 so as to delete, from the host vehicle map information, information on a road that is determined not to be useful to the occupant him/herself, e.g., the road is heavily congested, the road is narrow in width, or the road is dangerous.

Note that when the navigation device mounted on the host vehicle is providing guidance on a route using host vehicle map information obtained before deleting information on a road, the navigation device re-searches a route using the host vehicle map information updated at step ST11.

At step ST5a, when the wireless communication unit 14 receives from the server device 20 a notification indicating that there is updating map information including the unknown target road, i.e., when information on the unknown target road is included in the master map information in the server device 20 ("YES" at step ST5a), the wireless communication unit 14 proceeds to step ST13. On the other hand, when the wireless communication unit 14 receives from the server device 20 a notification indicating that there is no updating map information including the unknown target road, i.e., when information on the unknown target road is not included in the master map information in the server device 20 ("NO" at step ST5a), the wireless communication unit 14 proceeds to step ST12. Note that the operation of the server device 20 will be described in detail in FIG. 9.

At step ST12, the wireless communication unit 14 transmits information on the unknown target road to the server device 20, and thereby notifies the server device 20 that a new road has been built.

At step ST13, the update determining unit 17 determines whether to update the host vehicle map information in the host vehicle information storage unit 12. Detailed operation at step ST13 will be described in detail in FIGS. 7 and 8. When the update determining unit 17 determines to update the host vehicle map information ("YES" at step ST13), the update determining unit 17 proceeds to step ST14, and when the update determining unit 17 determines not to update ("NO" at step ST13), the update determining unit 17 ends the operation shown in the flowchart of FIG. 6.

At step ST14, the wireless communication unit 14 receives from the update determining unit 17 a result of the determination indicating that the host vehicle map information is to be updated, and requests the server device 20 for updating map information including the unknown target road. Then, the wireless communication unit 14 receives updating map information including the unknown target road from the server device 20, and outputs the updating map information to the update determining unit 17. The update determining unit 17 instructs the map updating unit 15 to update the host vehicle map information using the updating map information received by the wireless communication unit 14.

Figure 7:
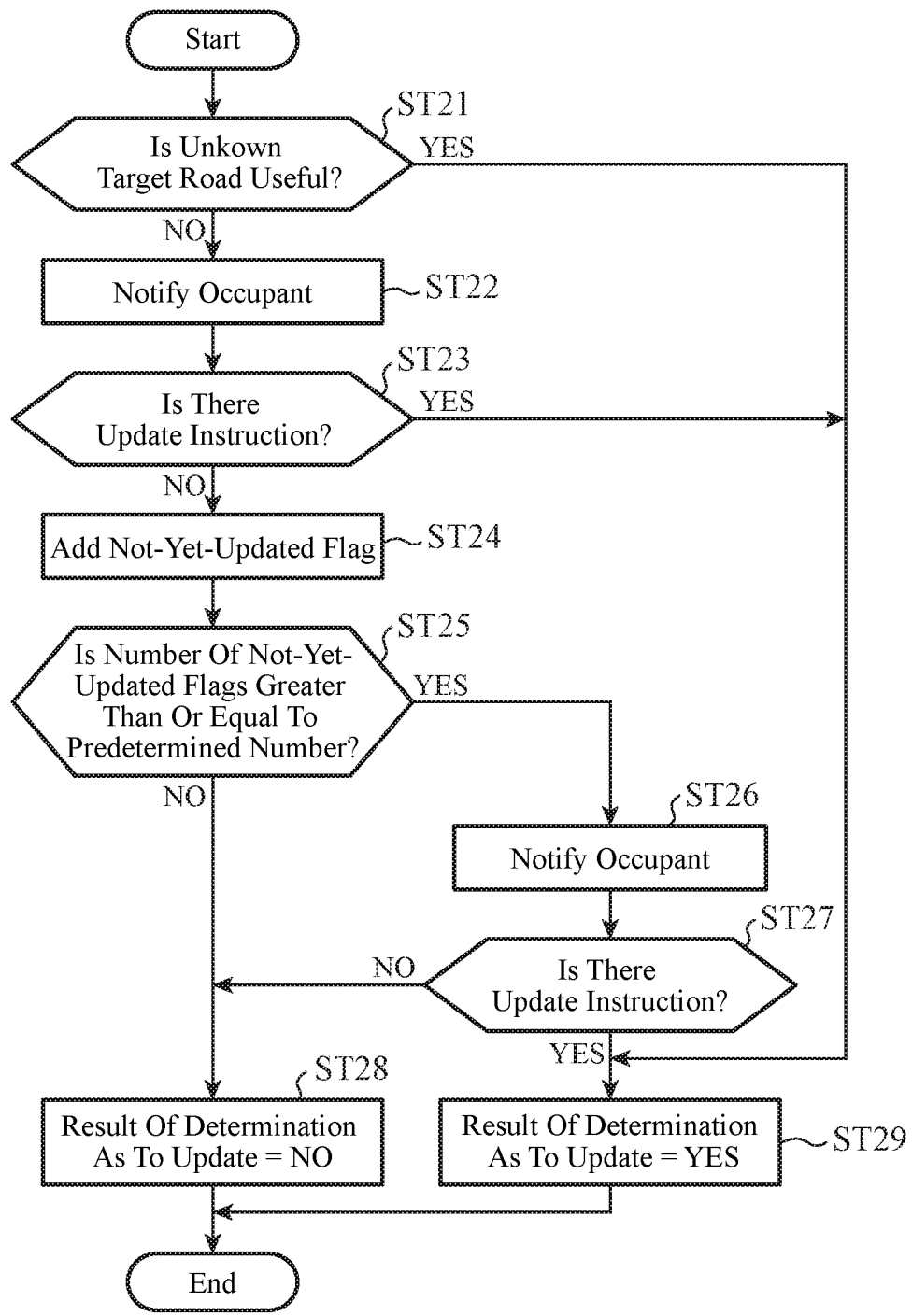
FIG. 7 is a flowchart showing the details of operation at step ST13 of FIG. 6.

FIG. 7 is a flowchart showing the details of operation at step ST13 of FIG. 6.

At step ST21, the update determining unit 17 determines whether the unknown target road that is confirmed, by the difference checking unit 13, not to be included in the host vehicle map information is useful to the occupant of the host vehicle. The detailed operation at step ST21 will be described in detail in FIG. 8. When the update determining unit 17 determines that the unknown target road is useful ("YES" at step ST21), the update determining unit 17 proceeds to step ST29, and when the update determining unit 17 determines that the unknown target road is useless ("NO" at step ST21), the update determining unit 17 proceeds to step ST22. Note that at step ST29, the update determining unit 17 determines to update the host vehicle map information. In this case, the update determining unit 17 determines, at step ST13 of FIG. 6, to update the host vehicle map information ("YES" at step ST13), and at step ST14, the update determining unit 17 instructs the wireless communication unit 14 to request the server device 20 for updating map information including the unknown target road determined to be useful.

At step ST22, the update determining unit 17 instructs the notifying unit 19 to notify the occupant that "there is an updatable road, though not useful". In response to the instruction from the update determining unit 17, the notifying unit 19 displays or vocally outputs that "there is an updatable road, though not useful". The occupant, after receiving the notification, determines whether to instantly update the host vehicle map information, and if the occupant instantly updates the host vehicle map information, the occupant performs an operation for an update instruction on the operating unit 18.

At step ST23, when the operating unit 18 receives an operation for an update instruction from the occupant ("YES" at step ST23), the operating unit 18 outputs information on the update instruction to the update determining unit 17, and proceeds to step ST29, or otherwise ("NO" at step ST23), the operating unit 18 proceeds to step ST24. Note that at step ST29, the update determining unit 17 determines to update the host vehicle map information. In this case, the update determining unit 17 determines, at step ST13 of FIG. 6, to update the host vehicle map information ("YES" at step ST13), and at step ST14, the update determining unit 17 instructs the wireless communication unit 14 to request the server device 20 for updating map information including the unknown target road that is determined to be useless but is instructed by the occupant to be updated.

At step ST24, the update determining unit 17 allows the host vehicle information storage unit 12, etc., to temporarily store information on the unknown target road that is determined by the occupant not to be instantly updated. In addition, the update determining unit 17 adds a "not-yet-updated flag" for storing the number of unknown target roads that are determined by the occupant not to be instantly updated.

At step ST25, the update determining unit 17 determines whether the number of not-yet-updated flags is greater than or equal to a predetermined number (e.g., 10). The predetermined number may be provided in advance to the update determining unit 17, or may be provided to the update determining unit 17 by the occupant operating the operating unit 18. When the update determining unit 17 determines that the number of not-yet-updated flags is greater than or equal to the predetermined number ("YES" at step ST25), the update determining unit 17 proceeds to step ST26, and when the number of not-yet-updated flags is less than the predetermined number ("NO" at step ST25), the update determining unit 17 proceeds to step ST28.

At step ST26, the update determining unit 17 instructs the notifying unit 19 to notify the occupant that "there are updatable roads, though not useful, whose number is greater than or equal to the predetermined number". In response to the instruction from the update determining unit 17, the notifying unit 19 displays or vocally outputs that "there are updatable roads, though not useful, whose number is greater than or equal to the predetermined number". The occupant, after receiving the notification, determines whether to update the host vehicle map information, and when the occupant makes an update, the occupant performs an operation for an update instruction on the operating unit 18.

At step ST27, when the operating unit 18 receives an operation for an update instruction from the occupant ("YES" at step ST27), the operating unit 18 outputs information on the update instruction to the update determining unit 17, and proceeds to step ST29, or otherwise ("NO" at step ST27), the operating unit 18 proceeds to step ST28. Note that at step ST29, the update determining unit 17 determines to update the host vehicle map information. In this case, the update determining unit 17 determines, at step ST13 of FIG. 6, to update the host vehicle map information ("YES" at step ST13), and at step ST14, the update determining unit 17 obtains from the host vehicle information storage unit 12, etc., information on the unknown target roads whose number is greater than or equal to the predetermined number and which are determined by the occupant not to be instantly updated, and instructs the wireless communication unit 14 to request the server device 20 for updating map information including the obtained unknown target roads.

Note that when the number of not-yet-updated flags is greater than or equal to the predetermined number ("YES" at step ST25), the update determining unit 17 may proceed to step ST29 without inquiring the occupant whether to make an update, i.e., step ST26 and ST27 are skipped.

At step ST28, the update determining unit 17 determines not to update the host vehicle map information. In this case, the update determining unit 17 determines, at step ST13 of FIG. 6, not to update the host vehicle map information ("NO" at step ST13), and the update determining unit 17 ends the operation shown in the flowchart of FIG. 6.

Figure 8:
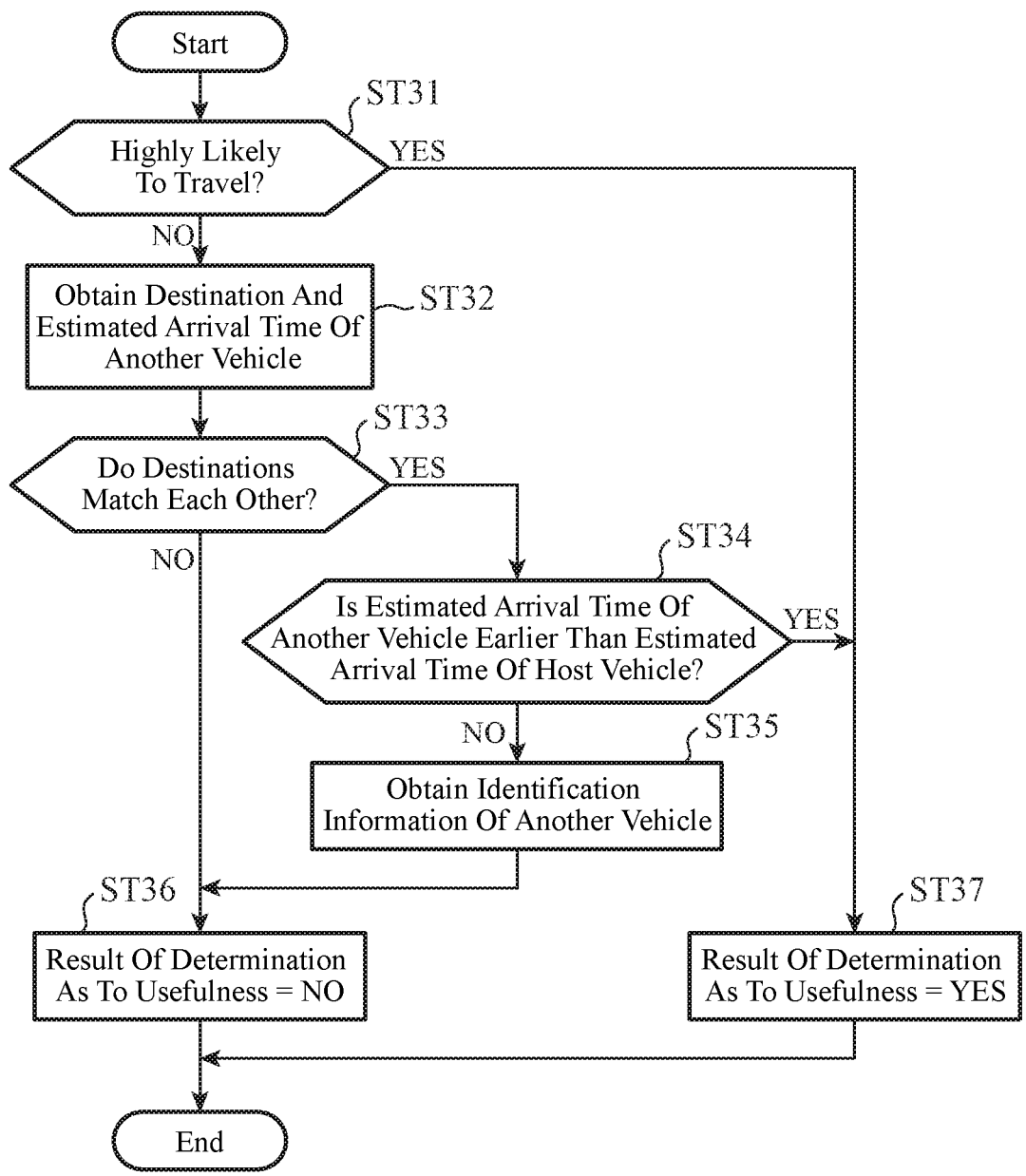
FIG. 8 is a flowchart showing the details of operation at step ST21 of FIG. 7.

FIG. 8 is a flowchart showing the details of operation at step ST21 of FIG. 7.

At step ST31, the update determining unit 17 determines whether the host vehicle is highly likely to travel on the unknown target road, using information such as the travel route history or destination of the host vehicle stored in the host vehicle information storage unit 12. When the update determining unit 17 determines that the host vehicle is highly likely to travel on the unknown target road ("YES" at step ST31), the update determining unit 17 proceeds to step ST37, and when the update determining unit 17 determines that the host vehicle is unlikely to travel on the unknown target road ("NO" at step ST31), the update determining unit 17 proceeds to step ST32. For example, the update determining unit 17 determines that the host vehicle is highly likely to travel on the unknown target road, when the unknown target road is a road that may be connected to a road on which the host vehicle has frequently traveled in the past, a road that may be connected in a direction in which the destination is present, a road that may be connected to a route that the host vehicle travels in the future, or the like ("YES" at step ST31).

At step ST32, the update determining unit 17 instructs the vehicle-to-vehicle communication unit 16 to perform vehicle-to-vehicle communication with another vehicle that is determined by the surrounding information obtaining unit 11 to be traveling on the unknown target road, i.e., another vehicle 2 of FIG. 2, to obtain vehicle information such as a destination and estimated arrival time. In response to the instruction from the update determining unit 17, the vehicle-to-vehicle communication unit 16 performs vehicle-to-vehicle communication with a map updating device 10 mounted on another vehicle traveling on the unknown target road, to receive vehicle information such as the destination and estimated arrival time of another vehicle, and outputs the vehicle information to the update determining unit 17.

At step ST33, the update determining unit 17 determines whether the destination of another vehicle obtained at step ST32 matches the destination to which the host vehicle is currently heading. Here, the destination of another vehicle and the destination of the host vehicle do not need to perfectly match each other and may be somewhat deviated from each other. When the update determining unit 17 determines that the destination of another vehicle matches the destination of the host vehicle ("YES" at step ST33), the update determining unit 17 proceeds to step ST34, and when the destination of another vehicle does not match the destination of the host vehicle ("NO" at step ST33), the update determining unit 17 proceeds to step ST36.

At step ST34, the update determining unit 17 compares the estimated arrival time of another vehicle obtained at step ST32 with the estimated arrival time of the host vehicle.

When the update determining unit 17 determines that the estimated arrival time of another vehicle is earlier than the estimated arrival time of the host vehicle ("YES" at step ST34), the update determining unit 17 proceeds to step ST37, and when the estimated arrival time of another vehicle is later than or the same as the estimated arrival time of the host vehicle ("NO" at step ST34), the update determining unit 17 proceeds to step ST35.

At step ST36, the update determining unit 17 determines that the unknown target road is useless. In this case, the update determining unit 17 determines, at step ST21 of FIG. 7, that the unknown target road is useless ("NO" at step ST21).

At step ST37, the update determining unit 17 determines that the unknown target road is useful. In this case, the update determining unit 17 determines, at step ST21 of FIG. 7, that the unknown target road is useful ("YES" at step ST21).

Note that the update determining unit 17 may perform operation shown at step ST35 as additional operation. At this step ST35, the update determining unit 17 instructs the vehicle-to-vehicle communication unit 16 to perform vehicle-to-vehicle communication with another vehicle that is determined by the surrounding information obtaining unit 11 to be traveling on the unknown target road, to obtain identification information of this another vehicle. In response to the instruction from the update determining unit 17, the vehicle-to-vehicle communication unit 16 performs vehicle-to-vehicle communication with the map updating device 10 mounted on this another vehicle to receive identification information of this another vehicle, and outputs the identification information to the update determining unit 17.

Though not shown in the flowcharts of FIGS. 6 to 8, after the host vehicle has arrived at the destination, the update determining unit 17 instructs the wireless communication unit 14 to request the server device 20 for vehicle information of another vehicle having the identification information obtained at step ST35. Then, the wireless communication unit 14 receives vehicle information of another vehicle corresponding to the identification information from the server device 20, and outputs the vehicle information to the update determining unit 17. The vehicle information of another vehicle is mainly information on actual arrival time at which another vehicle has arrived at the destination. The update determining unit 17 compares arrival time at which the host vehicle has actually arrived at the destination with the arrival time of another vehicle obtained from the server device 20. If the arrival time of another vehicle is earlier than the arrival time of the host vehicle, the update determining unit 17 determines that the unknown target road on which this another vehicle has traveled is useful, and allows the wireless communication unit 14 and the map updating unit 15 to perform operation at step ST14 and ST6 of FIG. 6.

Figure 9:
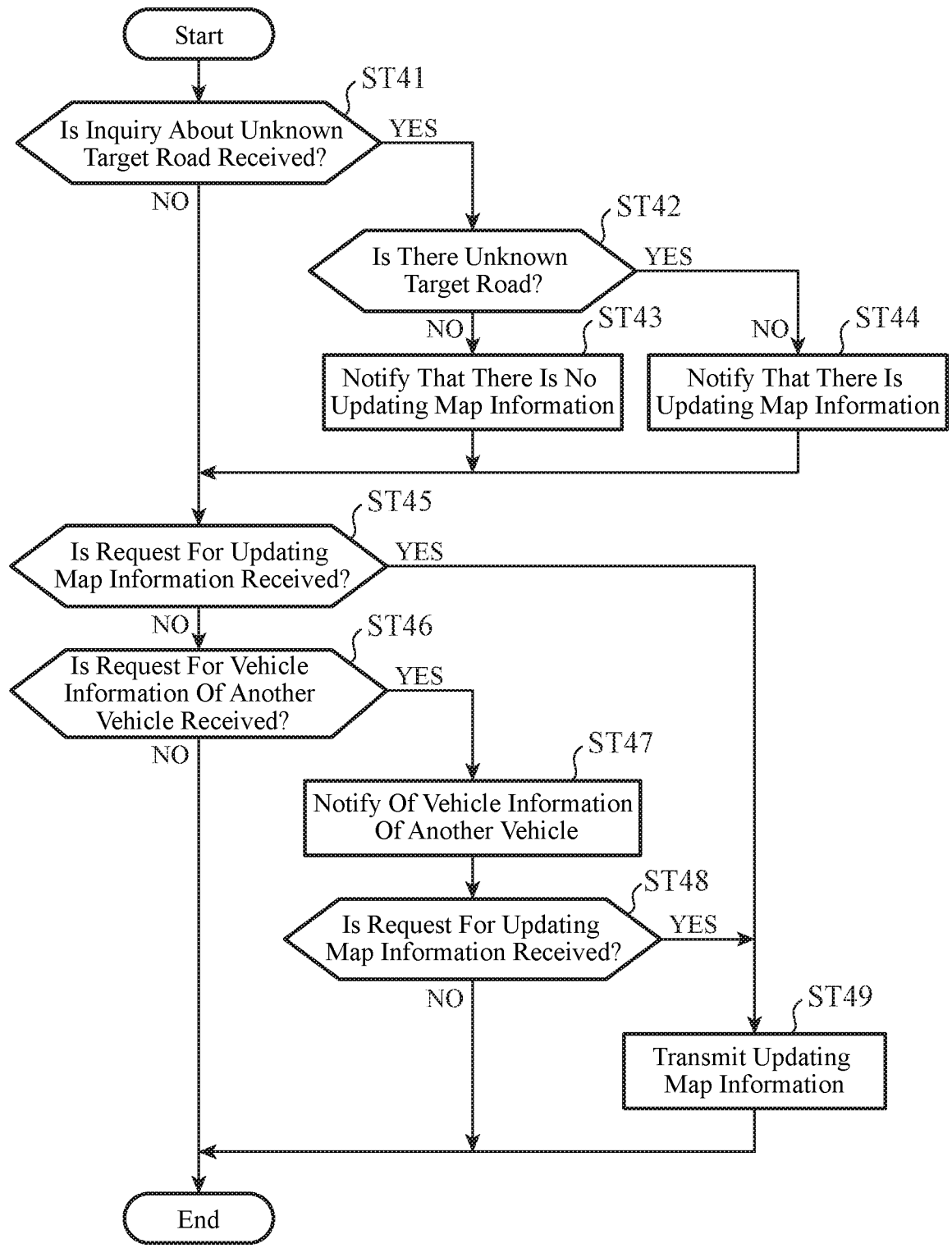
FIG. 9 is a flowchart showing exemplary operation of the server device according to the second embodiment.

FIG. 9 is a flowchart showing exemplary operation of the server device 20 according to the second embodiment. The server device 20 repeats the operation shown in the flowchart of FIG. 9.

At step ST41, when the wireless communication unit 21 receives an inquiry about whether an unknown target road is included in the master map information from the map updating device 10 ("YES" at step ST41), the wireless communication unit 21 proceeds to step ST42, or otherwise ("NO" at step ST41), the wireless communication unit 21 proceeds to step ST45. The inquiry is an inquiry made by the map updating device 10 at step ST4 of FIG. 6.

At step ST42, the processing unit 22 determines whether the unknown target road included in information on the inquiry received from the wireless communication unit 21 is included in the master map information in the storage unit 23. When the processing unit 22 determines that the unknown target road is not included in the master map information ("NO" at step ST42), the processing unit 22 proceeds to step ST43, and when the unknown target road is included in the master map information ("YES" at step ST42), the processing unit 22 proceeds to step ST44.

At step ST43, the wireless communication unit 21 transmits a notification indicating that there is no updating map information including the unknown target road to the map updating device 10.

At step ST44, the wireless communication unit 21 transmits a notification indicating that there is updating map information including the unknown target road to the map updating device 10.

At step ST45, when the wireless communication unit 21 receives a request for updating map information including the unknown target road from the map updating device 10 ("YES" at step ST45), the wireless communication unit 21 proceeds to step ST49, or otherwise ("NO" at step ST45), the wireless communication unit 21 proceeds to step ST46. The request is a request made by the map updating device 10 at step ST14 of FIG. 6.

At step ST46, when the wireless communication unit 21 receives a request for vehicle information of a vehicle having a piece of identification information from the map updating device 10 ("YES" at step ST46), the wireless communication unit 21 proceeds to step ST47, or otherwise ("NO" at step ST46), the wireless communication unit 21 ends the operation shown in the flowchart of FIG. 9. The request is a request made by the map updating device 10 at step ST35 of FIG. 8.

At step ST47, the processing unit 22 obtains from the storage unit 23 vehicle information having the identification information included in information on the request which is received from the wireless communication unit 21, and outputs the vehicle information to the wireless communication unit 21. The wireless communication unit 21 transmits the vehicle information received from the processing unit 22 to the map updating device 10. The vehicle information is mainly information on actual arrival time at which a vehicle having the above-described identification information has arrived at a destination.

At step ST48, when the wireless communication unit 21 receives a request for updating map information including the unknown target road from the map updating device 10 ("YES" at step ST48), the wireless communication unit 21 proceeds to step ST49, or otherwise ("NO" at step ST48), the wireless communication unit 21 ends the operation shown in the flowchart of FIG. 9. Note that the request is a request made by the map updating device 10 for the purpose of comparing actual arrival times after the host vehicle has arrived at the destination.

At step ST49, the processing unit 22 obtains updating map information including the unknown target road from the master map information in the storage unit 23, and outputs the updating map information to the wireless communication unit 21. The wireless communication unit 21 transmits the updating map information including the unknown target road to the map updating device 10.

As described above, the map updating device 10 according to the second embodiment includes the update determining unit 17 that determines whether an unknown target road that is confirmed, by the difference checking unit 13, not to be included in the host vehicle map information is useful to the occupant of the host vehicle. The map updating unit 15 updates the host vehicle map information using updating map information including the unknown target road that is determined by the update determining unit 17 to be useful. By this configuration, when an unknown target road useful to the occupant of the host vehicle has been detected, the map updating device 10 can immediately update the host vehicle map information.

In addition, in response to an update instruction from the occupant of the host vehicle, the map updating unit 15 of the second embodiment updates the host vehicle map information using updating map information including an unknown target road that is determined by the update determining unit 17 to be useless. By this configuration, when, even when an unknown target road is determined by the update determining unit 17 to be useless, the occupant determines that the unknown target road is useful, the map updating device 10 can update the host vehicle map information for the unknown target road.

In addition, when the number of unknown target roads that are determined by the update determining unit 17 to be useless has reached greater than or equal to a predetermined number, the map updating unit 15 of the second embodiment updates the host vehicle map information using updating map information for the unknown target roads whose number is greater than or equal to the predetermined number. By this configuration, the map updating device 10 can keep the host vehicle map information in the latest state even without making periodic updates with the server device 20. In addition, since there is no need for the map updating device 10 to periodically request the server device 20 to update the map information or for the server device 20 to periodically notify the map updating device 10 of an update to the map information, the amount of communication can be reduced.

In addition, in response to a delete instruction from the occupant of the host vehicle, the map updating unit 15 of the second embodiment deletes information on a road included in the host vehicle map information. By this configuration, when an updated unknown target road or a road already included in the host vehicle map information is not useful to the occupant, the map updating device 10 deletes information on the road from the host vehicle map information, and can thereby save the memory space of the host vehicle information storage unit 12. In addition, the navigation device (not shown) can search for and provide guidance on a route that meets occupant needs by using host vehicle map information from which information on a road is deleted in response to a delete instruction by the occupant.

In addition, the map updating device 10 of the second embodiment includes the vehicle-to-vehicle communication unit 16. The vehicle-to-vehicle communication unit 16 performs vehicle-to-vehicle communication with another vehicle having traveled on an unknown target road, to receive a destination and estimated arrival time of another vehicle. When the destination of another vehicle received by the vehicle-to-vehicle communication unit 16 matches a destination of the host vehicle, the update determining unit 17 compares the estimated arrival time of another vehicle received by the vehicle-to-vehicle communication unit 16 with estimated arrival time of the host vehicle, and determines that the unknown target road is useful when the estimated arrival time of another vehicle is earlier than the estimated arrival time of the host vehicle. By this configuration, the map updating device 10 can update the host vehicle map information using updating map information including an unknown target road whose estimated arrival time at a destination is earlier. Hence, the navigation device which is not shown can search for and provide guidance on a route that allows the host vehicle to arrive at the destination earlier, by using the above-described host vehicle map information.

In addition, the vehicle-to-vehicle communication unit 16 of the second embodiment performs vehicle-to-vehicle communication with another vehicle having traveled on an unknown target road, to receive a destination of another vehicle. When the destination of another vehicle received by the vehicle-to-vehicle communication unit 16 matches a destination of the host vehicle, the wireless communication unit 14 receives arrival time at which another vehicle has arrived at the destination and which is stored in the server device 20, from the server device 20. The update determining unit 17 compares the arrival time of another vehicle received by the wireless communication unit 14 with arrival time of the host vehicle, and determines that the unknown target road is useful when the arrival time of another vehicle is earlier than the arrival time of the host vehicle. By this configuration, when the map updating device 10 has not instantly updated the host vehicle map information upon detection of an unknown target road, the map updating device 10 can make an update to the host vehicle map information based on the usefulness of the unknown target road, after the host vehicle has arrived at the destination.

Finally, hardware configurations of the map updating device 10 and the server device 20 according to the embodiments will be described.

Figure 10:
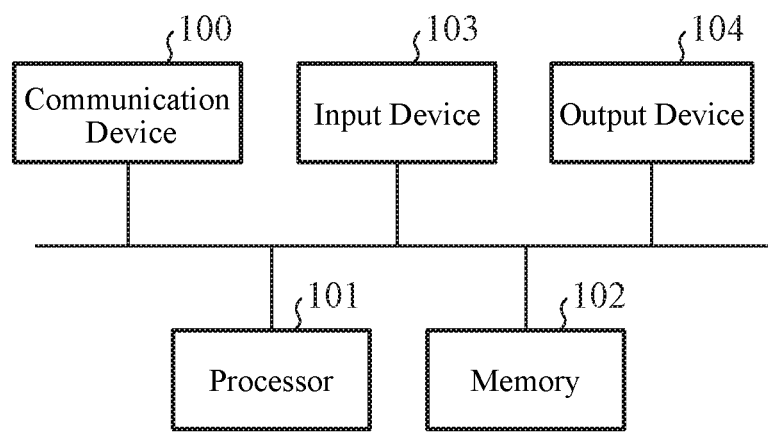
FIG. 10 is a diagram showing an exemplary hardware configuration of the map updating device according to the embodiments.

FIG. 10 is a diagram showing an exemplary hardware configuration of the map updating device 10. The wireless communication unit 14 and the vehicle-to-vehicle communication unit 16 of the map updating device 10 are a communication device 100. The operating unit 18 of the map updating device 10 is an input device 103 such as a touch panel or a voice recognition device. The notifying unit 19 of the map updating device 10 is an output device 104 such as a display or an audio output device. The host vehicle information storage unit 12 of the map updating device 10 is a memory 102.

Functions of the surrounding information obtaining unit 11, the difference checking unit 13, the map updating unit 15, and the update determining unit 17 of the map updating device 10 are a processor 101 that executes programs stored in the memory 102. The functions of the surrounding information obtaining unit 11, the difference checking unit 13, the map updating unit 15, and the update determining unit 17 are implemented by software, firmware, or a combination of software and firmware. The software or the firmware is described as a program and stored in the memory 102. The processor 101 implements the function of each unit by reading and executing a program stored in the memory 102. Namely, the map updating device 10 includes the memory 102 for storing a program that causes the steps shown in the flowcharts of FIG. 3, etc., to be consequently performed when executed by the processor 101. In addition, it can also be said that the program causes a computer to perform procedures or methods of the surrounding information obtaining unit 11, the difference checking unit 13, the map updating unit 15, and the update determining unit 17.

Figure 11:
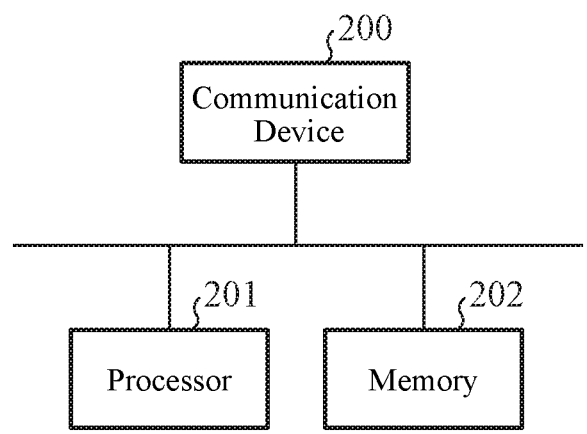
FIG. 11 is a diagram showing an exemplary hardware configuration of the server device according to the embodiments.

FIG. 11 is a diagram showing an exemplary hardware configuration of the server device 20. The wireless communication unit 21 of the server device 20 is a communication device 200. The storage unit 23 of the server device 20 is a memory 202. A function of the processing unit 22 of the server device 20 is a processor 201 that executes a program stored in the memory 202. The function of the processing unit 22 is implemented by software, firmware, or a combination of software and firmware. The processor 201 implements the function of the processing unit 22 by reading and executing a program stored in the memory 202. Namely, the server device 20 includes the memory 202 for storing a program that causes the steps shown in the flowchart of FIG. 9 to be consequently performed when executed by the processor 201. In addition, it can also be said that the program causes a computer to perform a procedure or a method of the processing unit 22.

Here, the processors 101 and 201 refer to a Central Processing Unit (CPU), a processing device, an arithmetic unit, a microprocessor, a microcomputer, or the like.

The memories 102 and 202 may be a nonvolatile or volatile semiconductor memory such as a Random Access Memory (RAM), a Read Only Memory (ROM), an Erasable Programmable ROM (EPROM), or a flash memory, or may be a magnetic disk such as a hard disk or a flexible disk, or may be an optical disc such as a Compact Disc (CD) or a Digital Versatile Disc (DVD).

Note that in the invention, a free combination of the embodiments, modifications to any component of the embodiments, or omissions of any component of the embodiments are possible within the scope of the invention.

INDUSTRIAL APPLICABILITY

Map updating devices according to the invention add information on a newly built road to host vehicle map information, and thus, are suitable for use as, for example, map updating devices that update map information used by a navigation device.

REFERENCE SIGNS LIST

1, 1a: host vehicle, 2: another vehicle, 3, 4, 5: road, 6: updating map information, 10: map updating device, 11: surrounding information obtaining unit, 12: host vehicle information storage unit, 13: difference checking unit, 14: wireless communication unit, 15: map updating unit, 16: vehicle-to-vehicle communication unit, 17: update determining unit, 18: operating unit, 19: notifying unit, 20: server device, 21: wireless communication unit, 22: processing unit, 23: storage unit, 100, 200: communication device, 101, 201: processor, 102, 202: memory, 103: input device, and 104: output device

The invention claimed is:

1. A map updating device comprising:
a processor to execute a program; and
a memory to store the program which, when executed by the processor, performs processes of,
obtaining information indicating roads and a facility present around a host vehicle and a travel state of a first vehicle;
determining whether the first vehicle has traveled on a different road than a road on which the host vehicle travels, on a basis of the obtained information;
storing host vehicle map information;
checking whether a target road is included in the host vehicle map information, the target road being determined to have been traveled by the first vehicle;
inquiring of a server device whether the target road is included in master map information stored in the server device;
receiving updating map information including the target road from the server device when the target road is included in the master map information, the target road being confirmed not to be included in the host vehicle map information; and
updating the host vehicle map information using the received updating map information including the target road, wherein
the obtained information is generated based on processing of an image, captured by a camera on the host vehicle, corresponding to a traveling direction of the host vehicle.

2. The map updating device according to claim 1, wherein the processes further include determining whether the target road is useful to an occupant of the host vehicle, the target road being confirmed not to be included in the host vehicle map information,
wherein in the processes, the host vehicle map information using updating map information including the target road that is determined to be useful is updated.

3. The map updating device according to claim 2,
wherein in the processes, in response to an update instruction from the occupant of the host vehicle, the host vehicle map information using updating map information including the target road that is determined to be useless is updated.

4. The map updating device according to claim 2,
wherein in the processes, when the number of target roads that are determined to be useless has reached greater than or equal to a predetermined number, the host vehicle map information using updating map information for the target roads whose number is greater than or equal to the predetermined number is updated.

5. The map updating device according to claim 2,
wherein the processes further include performing vehicle-to-vehicle communication with the first vehicle having traveled on the target road and receiving a destination and estimated arrival time of the first vehicle,
wherein in the processes, when the received destination of the first vehicle matches a destination of the host vehicle, the received estimated arrival time of the first vehicle is compared with an estimated arrival time of the host vehicle, and it is determined that the target road is useful when the estimated arrival time of the first vehicle is earlier than the estimated arrival time of the host vehicle.

6. The map updating device according to claim 2,
wherein the processes further include performing vehicle-to-vehicle communication with the first vehicle having traveled on the target road and receiving a destination of the first vehicle,
wherein in the processes, when the received destination of the first vehicle matches a destination of the host vehicle, an arrival time, stored in the server device, at which the first vehicle has arrived at the destination from the server device is received, and
the received arrival time of the first vehicle is compared with an arrival time of the host vehicle, and it is determined that the target road is useful when the arrival time of the first vehicle is earlier than the arrival time of the host vehicle.

7. The map updating device according to claim 1,
wherein in the processes, in response to a delete instruction from an occupant of the host vehicle, information on a road included in the host vehicle map information is deleted.

8. The map updating device according to claim 1,
wherein in the processes, when the host vehicle is traveling straight ahead and the first vehicle has made a right or left turn, it is determined that a road that the first vehicle has entered by making a right or left turn is the target road.

9. The map updating device according to claim 1,
wherein in the processes, the server device is inquired about whether the target road is included in the master map information, and information on the target road is transmitted to the server device when the target road is not included in the master map information, the target road being confirmed not to be included in the host vehicle map information.

10. The map updating device according to claim 9,
wherein the server device is allowed to update the master map information on a basis of the information on the target road transmitted to the server device.

11. A map updating system comprising:
a server device for storing master map information; and
a map updating device comprising:
  a processor to execute a program; and
  a memory to store the program which, when executed by the processor, performs processes of,
    obtaining information indicating roads and a facility present around a host vehicle and a travel state of a first vehicle;
    determining whether the first vehicle has traveled on a different road than a road on which the host vehicle travels, on a basis of the obtained information;
    storing host vehicle map information;
    checking whether a target road is included in the host vehicle map information, the target road being determined to have been traveled by the first vehicle;
    inquiring of the server device whether the target road is included in the master map information stored in the server device;
    receiving updating map information including the target road from the server device when the target road is included in the master map information, the target road being confirmed not to be included in the host vehicle map information; and
    updating the host vehicle map information using the received updating map information including the target road, wherein
    the obtained information is generated based on processing of an image, captured by a camera on the host vehicle, corresponding to a traveling direction of the host vehicle.

12. A map updating method comprising:
obtaining information indicating roads and a facility present around a host vehicle and a travel state of a first vehicle;
determining whether the first vehicle has traveled on a different road than a road on which the host vehicle travels, on a basis of the obtained information;
checking whether a target road is included in host vehicle map information stored in a host vehicle information storage, the target road being determined to have been traveled by the first vehicle;
inquiring of a server device whether the target road is included in master map information stored in the server device, the target road being confirmed not to be included in the host vehicle map information;
receiving updating map information including the target road from the server device when the target road is included in the master map information; and
updating the host vehicle map information using the received updating map information including the target road, wherein
the obtained information is generated based on processing of an image, captured by a camera on the host vehicle, corresponding to a traveling direction of the host vehicle.

* * * * *